United States Patent [19]

Wilkinson et al.

[11] Patent Number: 4,806,298

[45] Date of Patent: Feb. 21, 1989

[54] A CUTTER FOR CUTTING RESIN IMPREGNATED STRANDS AND A METHOD AND APPARATUS FOR MAKING A CHARGE FOR MOLDING A FIBER REINFORCED PART

[75] Inventors: Robert E. Wilkinson, Birmingham; Joseph N. Epel, Southfield, both of Mich.

[73] Assignee: The Budd Company, Troy, Mich.

[21] Appl. No.: 14,188

[22] Filed: Feb. 10, 1987

Related U.S. Application Data

[63] Continuation of Ser. No. 673,902, Nov. 21, 1984, abandoned.

[51] Int. Cl.$^4$ .................. B29B 11/02; B26D 1/147
[52] U.S. Cl. .................. 264/115; 83/346; 83/674; 83/913; 264/129; 264/137; 264/143; 425/106; 425/289; 118/36; 118/405; 118/420; 427/434.7
[58] Field of Search .................. 264/143, 134, 108, 109, 264/115, 129, 137; 34/276, 347; 83/84, 109, 161, 167, 909, 913, 922, 674, 346, 348, 542; 427/434.7, 434.4; 118/405, 410, 420, 36; 425/106, 289

[56] References Cited

U.S. PATENT DOCUMENTS

| | | | |
|---|---|---|---|
| 2,539,549 | 1/1951 | Rayburn | 118/420 |
| 2,729,028 | 1/1956 | Slayter et al. | 264/115 |
| 3,042,570 | 7/1962 | Bradt | 118/405 |
| 3,150,026 | 9/1964 | Talo | 118/405 |
| 3,471,322 | 10/1969 | Medney | 118/405 |
| 3,473,513 | 10/1969 | Paul | 118/405 |
| 3,480,499 | 11/1969 | Paul | 118/405 |
| 3,503,371 | 3/1970 | Meyers | 118/405 |
| 3,921,874 | 11/1975 | Spain | 264/143 |
| 4,003,773 | 1/1977 | Grable | 264/143 |
| 4,097,991 | 7/1978 | Proulx | 30/276 |
| 4,167,429 | 9/1979 | Ackley | 118/420 |
| 4,220,496 | 9/1980 | Carley et al. | 156/174 |
| 4,220,497 | 9/1980 | Carley | 156/174 |
| 4,294,490 | 10/1981 | Woelfel | 301/63 |
| 4,294,639 | 10/1981 | Woelfel et al. | 156/185 |
| 4,340,342 | 7/1982 | Kim | 264/143 |
| 4,376,749 | 3/1983 | Woelfel | 264/258 |
| 4,505,777 | 3/1985 | Richter | 264/108 |
| 4,505,868 | 3/1985 | Krueger et al. | 264/108 |

FOREIGN PATENT DOCUMENTS

0903178 2/1982 U.S.S.R. .................. 427/434.4

Primary Examiner—Jan H. Silbaugh
Assistant Examiner—Hubert C. Lorin
Attorney, Agent, or Firm—Harness, Dickey & Pierce

[57] ABSTRACT

A method and apparatus for making a charge used in molding a fiber reinforced part. Continuous strands of fibers are impregnated with resin and then cut into segments of predetermined lengths. The segments are collected so that the resin impregnated fiber segments are piled together to form the charge. In one embodiment, the fibers are collected in a controlled manner to provide preselected fiber orientation for the molded part. Also a cutter mechanism is provided for cutting resin impregnated fiber strands pulled over a first rotating drum.

21 Claims, 2 Drawing Sheets

A CUTTER FOR CUTTING RESIN IMPREGNATED STRANDS AND A METHOD AND APPARATUS FOR MAKING A CHARGE FOR MOLDING A FIBER REINFORCED PART

This is a continuation of U.S. patent application Ser. No. 673,902, filed Nov. 21, 1984, entitled Method and Apparatus for Making a Charge for Molding a Fiber Reinforced Part, now abandoned.

Also a cutter mechanism is provided for cutting resin impregnated fiber strands pulled over a first rotating drum.

TECHNICAL FIELD

This invention relates to molding materials and, more particularly, to methods and apparatus for making a charge used in forming a fiber reinforced part by molding techniques.

BACKGROUND ART

Fiber reinforced plastic (FRP) parts are finding increasing acceptance in the marketplace. FRP articles, also known as composites, generally include a resin mixed with reinforcing fibers and various fillers. The part is typically made by molding a charge into the shape of the desired part under heat and pressure. The charge spreads to fill the mold cavity and the charge is maintained in the mold for a sufficient period of time to allow the resin to cure to form the finished part.

Among the attributes of composite articles is that they are generally lightweight but exhibit relatively high strength characteristics. The strength of these parts is due in large part to the reinforcing fibers in the resin.

The charge composition varies considerably from application to application. One of the most commonly used charges is known as sheet molding compound (SMC). SMC is typically made by a continuous process whereby reinforcing fibers are applied to a paste containing a thermosetting resin. The following patents disclose such a method of making an SMC-like charge:

U.S. Pat. No. 4,294,490 to Woelfel;
U.S. Pat. No. 4,294,639 to Woelfel et al; and
U.S. Pat. No. 4,376,749 to Woelfel.

These patents, along with U.S. Pat. Nos. 4,220,496 to Carley et al and 4,220,497 to Carley, also disclose a method of making a charge known as XMC, a trademark of P.P.G. Industries, Inc. Briefly, XMC compounds are made by winding continuous fibers around a drum so as to achieve a generally helical shaped configuration of the fibers.

While XMC and SMC charges have generally performed satisfactorily for most applications, the processes for making them do not readily lend themselves to precise control of the fiber orientation therein. This is especially true when it is desired to orient the fibers in a multiplicity of different, but precisely controlled, orientations.

Bulk molding compound (BMC) and thick molding compound (TMC) are conventionally used in transfer or injection molding processes. It is often desirable to use fiber reinforcement in BMC and TMC charges. Fiber reinforced BMC is generally made by mixing the resin, filler and cut raw fiber strands or bundles together in a mixer. Typically, the mixing is accomplished by using two blades that rotate in opposite directions thereby providing a kneading action. Unfortunately, this mixing action can separate the individual fibers in the strands unless the mixing is carefully controlled. Such degradation of the strand integrity can lead to a loss of physical properties of the molded part since the fibers provide a more efficient reinforcement if they remain integrated as strands instead of being separated into individual fiber filaments.

SUMMARY OF THE INVENTION

According to the present invention, continuous strands of fiber filaments are impregnated with resin and then cut into segments of predetermined lengths. The resin impregnated segments are collected together to form a charge for molding a fiber reinforced part. In one embodiment, the impregnated segments are collected in a controlled manner so that the segments are piled together and lie in a given orientation. Preferably, the impregnated strands are pulled by a rotating drum through a resin bath and cut into segments with an associated rotating cutter mechanism. The cut segments are allowed to fall into a receptacle which has been formed into a shape generally corresponding to the desired shape of the charge. The receptacle can be moved relative to the falling segments to change the preferred orientation of the fibers into a multiplicity of different directions. For example, the receptacle can be rotated so that the segments are all oriented in essentially a radially outwardly extending direction.

Apparatus is made pursuant to this invention that comprises first means for pulling continuous strands of fiber filaments through a resin bath to thereby impregnate the strands with resin. Second means are provided for cutting the impregnated strands into segments of predetermined lengths, and, third means operate to collect the segments together to form a charge. In a particular embodiment, the third means operates to collect the segments in a controlled manner so that the segments are piled together and lie in a given orientation.

Pursuant to another feature of this invention, an improved cutter mechanism is provided.

BRIEF DESCRIPTION OF THE DRAWINGS

Various advantages of the present invention will become apparent to the skilled practitioner upon a study of the specification and by reference to the drawings in which.

DESCRIPTION OF THE PREFERRED EMBODIMENT

Figure 1:
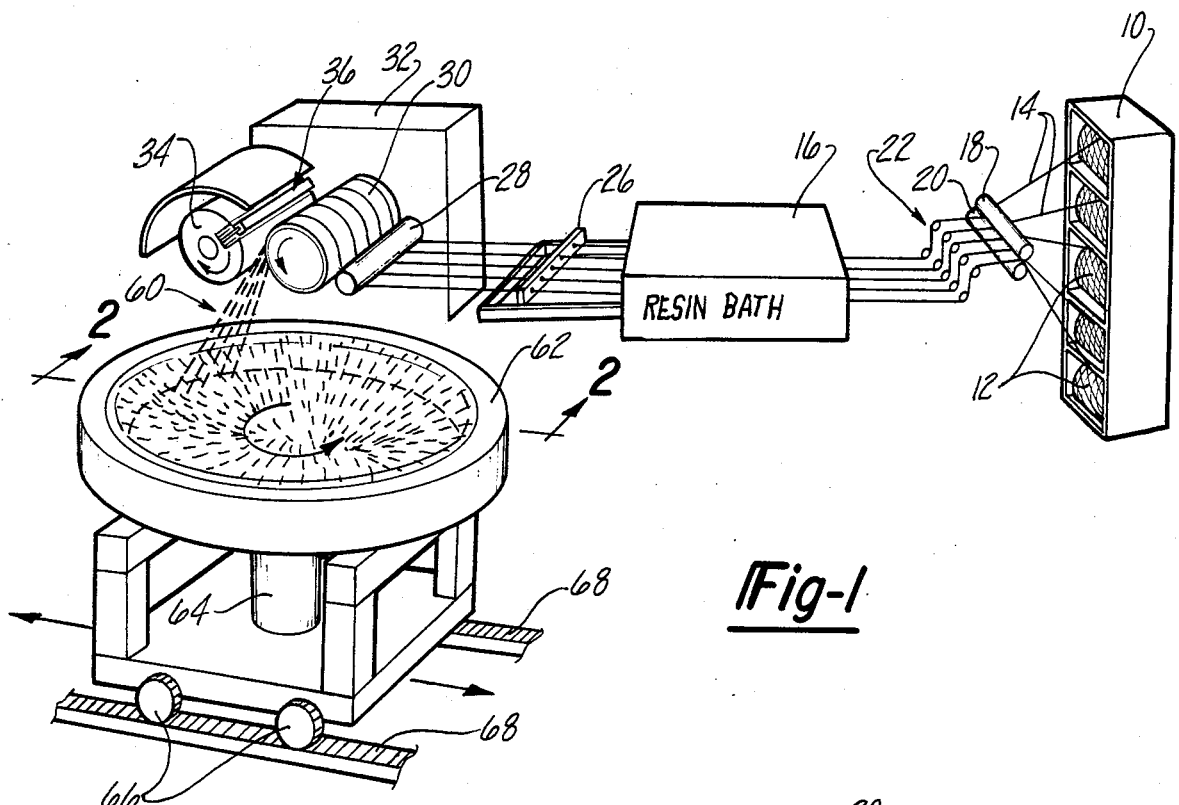
FIG. 1 is a perspective view of apparatus used in carrying out the teachings of the present invention.

Referring now to the drawings, a creel or rack 10 contains a plurality of bobbins or packages 12 of continuous raw fiber strands 14. The strands 14 each contain a large plurality of individual fiber filaments. Almost any fiber strands can be used in the present invention which results in a composite of high strength and which possesses sufficient tensile strength to be pulled through the resin bath 16. Examples of strands that may be utilized in this invention are strands of polyimide fibers, polyester fibers, polyamide fibers, natural fibers and metal fibers. Strands of polyaramide fibers, glass fibers and carbon fibers are preferred, with glass fibers presently providing the best results for most applications.

The resin in bath 16 may be any material that provides the necessary bonding and strength for the composite article formed. Among typical resins are polyaramides and novalacs. Suitable resins for the instant process are vinyl esters, epoxy resins, polyurethanes and polyesters. Preferred resin materials are thermally cured polyester resins. Bath 16 may take the form of any suitable construction although a substantially closed cell having resin recirculating therethrough is presently preferred as disclosed in more detail in concurrently filed U.S. patent application Ser. No. 673,904, now U.S. Pat. No. 4,643,126, entitled "Method and Apparatus for Impregnating Fiber Strands", having the same inventors and assignee as the present invention. This application is hereby incorporated by reference.

The continuous raw fiber strands 14 pass between bars 18, 20 and a set of adjustable eyelets or combs 22 before entering bath 16. At start-up, the ends of strands 14 are threaded through metering orifices 26 and pass underneath bar 28 where the strands 14 are wrapped about the circumference of a drum 30. Drum 30 is mounted to a stand 32 adjacent a second rotating drum 34.

Figure 3:
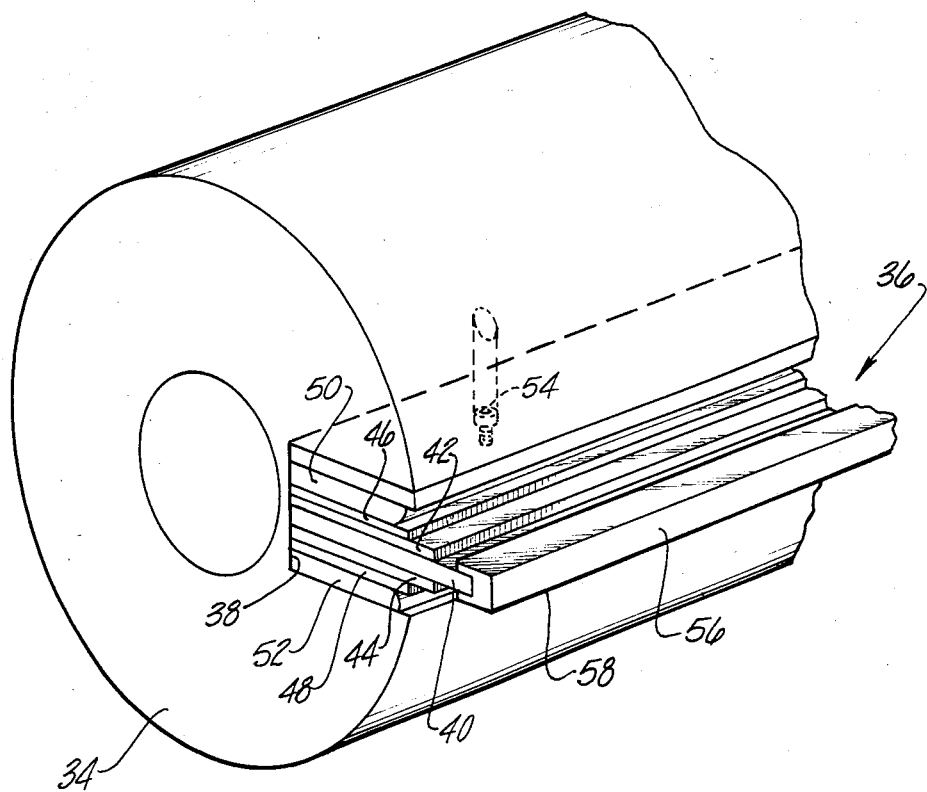
FIG. 3 is an enlarged cross-sectional view of portions of the cutter mechanism.

Drum 34 is part of a cutter mechanism generally designated by the numeral 36. As can be seen most clearly in FIG. 3, a slot 38 is formed in the outer surface of drum 34 and extends parallel to its axis of rotation. A spring member 40 is mounted in slot 38 so that it extends radially outwardly from drum 34; i.e. transversely to the drum axis. Preferably, spring member 40 takes the form of a generally rectangular planar sheet of material which is relatively stiff when forces are exerted against it in the plane of the sheet but is otherwise compliant in other directions. The degree of compliancy or resiliency of spring 40 in these other directions can be easily controlled by the amount of overlap of plates 42, 44, 46 and 48; a pair of the plates being located on each side of spring 40. Spring 40 is a sheet of composite graphite material in this particular embodiment but other suitable spring materials can be used. Plates 42–48 are made of steel in this embodiment. Spring 40 and plates 42–48 are held in slot 38 by a pair of elongated holders 50, 52 which are compressed by a set screw 54. A cutting head 56 is fixed to the outer edge of spring 40. Cutting head 56 is made of tungsten carbide material in this example and presents a relatively sharp edge 58 for cutting the strands.

In operation, means (not shown) are provided for rotating drum 30 in a counterclockwise direction in synchronism with the rotation of drum 34 which rotates in a clockwise direction. The rotation of drum 30 operates to pull the raw fiber strands 14 through the resin bath 16 where the strands become impregnated with resin. The impregnated strands exit bath 16 and pass through metering orifices 26 which squeegee out excess resin.

Figure 2:
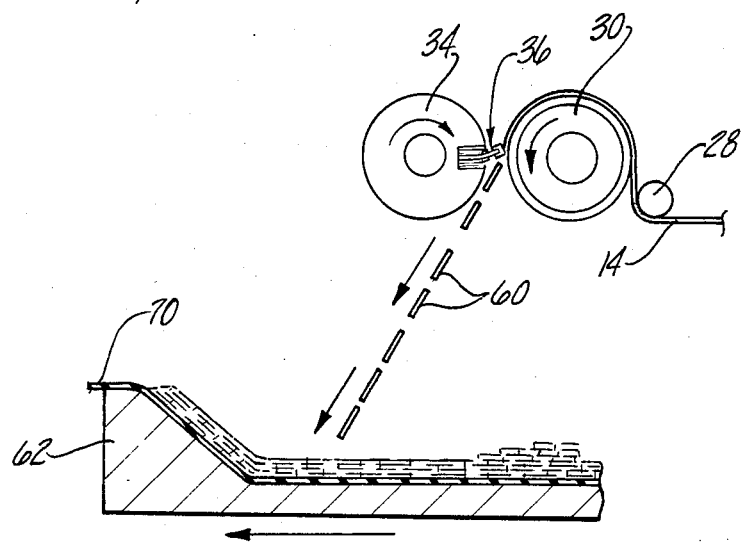
FIG. 2 is a view showing portions of the receptacle in cross section beneath the cutting mechanism for cutting the fiber strands.

As the impregnated strands 14 pass over drum 30 they are cut into segments 60 by the operation of cutter mechanism 36. The relative rotational speed between drum 34 and drum 30 determines the lengths of the individual segments 60. When the cutting edge 58 comes into contact with drum 30 it simultaneously severs the plurality of strands 14 thereon. The spring 40 is sufficiently compliant so that it will bend as shown in FIG. 2 during continued rotation of the drums. This permits a good deal of latitude in the spacing tolerance between the cutting head 56 and drum 30 since the spring 40 will bend to compensate for any overlap. In addition, this construction tends to minimize noise during the operation and decreases down times which may otherwise be necessary to adjust the cutter head spacing when the edge wears. The segment lengths may vary as desired but at the present time segment lengths in the range of 0.25–2 inches appear most practical. Preferably, the segments 60 are cut into lengths of 0.75 to 1.50 inches, with lengths of about 1 inch being most preferred. Segment lengths in excess of 2 inches find difficulty in parting from the drum 30 after they are cut. Segment lengths less than 0.25 inch are difficult to obtain due to the very high rotational speed that would be required from cutting drum 34. Also, segments smaller than this are difficult to orient in a predetermined pattern.

The cut resin impregnated strands are then collected together in a variety of different ways to form a charge for molding a fiber reinforced part. In the particular embodiment shown in the drawings, the cut segments 60 are collected in a controlled manner so that the segments are piled together and lie in a given orientation. This is preferably accomplished by way of a receptacle that moves underneath the cutter mechanism 36 in various directions so as to control the orientation of the cut segments 60. When the segments are cut and allowed to fall in the direction they are thrown from drum 30, their orientation is generally perpendicular to the axis of the rotating drums 30, 34, i.e. the cut segments 60 generally remain in the same orientation as the axes of the strands 14 from which the segments are cut.

The swath of the region onto which the segments 60 are deposited can be varied by a variety of factors such as the number of strands 14 being simultaneously cut, the lateral spacing therebetween, etc. For example, if the swath of the deposited region is to be small, then a fewer number of strands are simultaneously cut and/or eyelets or the like to group the strands together into a closer spacing before they are cut may be used.

In the drawings, the receptacle takes the form of a cup-shaped disc 62. Preferably, the receptacle can move in a variety of different directions so as to alter the orientation of the cut segments 60. In this embodiment, disc 62 is capable of rotating as well as being movable back and forth in a direction generally perpendicular to the axes of the rotating drums 30, 34. Rotation of the disc 62 causes the cut segments 60 to lie essentially in a radially outwardly extending direction. Rotation of disc 62 can be provided by a number of different mechanisms such as by way of a motor 64. Likewise, the linear movement of disc receptacle 62 can be done in different ways. Preferably, motor 64 is connected through a gearing arrangement (not shown) to drive the wheels 66 mounted on a track 68. The linear movement of disc 62 controls the thickness of the cut segments that are deposited on radially extending regions of the charge being formed. As shown in FIG. 2, it may, in some instances, be desirable to have the center of the charge thicker than the periphery thereof. This can be easily accomplished by keeping the cutter mechanism 36 above the center of the disc 62 for a longer period of time than at the periphery thereof.

Once the desired thickness of the charge has been achieved, the charge can be removed from the receptacle and the resin allowed to partially thicken or "B-stage" as this is commonly referred to in the art. It is generally advisable to line the interior of the receptacle with a release sheet 70 to aid in removing the charge from the receptacle. Generally, it is preferable to allow the resin to partially thicken so that the charge can be more easily manipulated. Some thickening can occur before the charge is removed from the receptacle and/or the charge may be placed in an oven to more rapidly achieve this semi-solid state. After it is B-staged, the charge is then ready to be inserted, for example, into a compression mold for forming at least a portion of the composite article.

An alternative method is to collect the cut resin impregnated strands from cutter mechanism 36 in a hopper which feeds into a transfer or injection molding machine. The impregnated strands thus form a charge which is typically forced into the mold by way of a ram or screw drive. While this method does not provide the controlled fiber orientation as does the method discussed above, it still is expected to provide the part with excellent reinforcement. This is because the plural fibers in each strand tend to remain together in the method of this invention and are not separated as is the case in the conventional charge making process discussed herein where mixing of raw (unimpregnated) strands with the resin was required.

From the foregoing, it can be appreciated that the present invention enables one to relatively easily produce a charge that is capable of providing a part with excellent reinforcement properties. If desired, accurate control of the orientation of the fibers in the charge can be obtained relatively easily and without substantial expense. Charges made in accordance with this invention can be used for forming a wide variety of parts such as doors with selective reinforcement areas therein, automotive parts such as panels, wheels, and the like; skis and almost any other composite article where it is advantageous to control the orientation of the reinforcing fibers therein. The full extent of the contribution to the art made by way of this invention will become apparent to the skilled practitioner after a study of the specification, drawings and claims.

We claim:

1. A method of making a fiber reinforced part comprising:
    pulling continuous strands of raw fibers through a resin bath by a first rotating drum;
    wetting and impregnating said strands with curable resin from said bath;
    cutting the wet flaccid resin impregnated strands on the drum with a rotating cutter mechanism into segments of predetermined lengths before the resin cures, the cutter mechanism having a second counter rotating drum spaced from the first drum and carrying a radially extending spring member with a cutting head attached to the end thereof, the second drum being spaced from the first drum by a distance to permit the spring member to bend when the head strikes the wet strands on the first drum;
    collecting the segments in a predetermined orientation so that the segments are piled together to form the charge; and
    forming a fiber reinforced part from said charge.

2. The method of claim 1 which includes the steps of:
    allowing the cut segments to fall into a receptacle located beneath the cutter mechanism.

3. The method of claim 2 wherein the receptacle is moved relative to the cutter mechanism in at least two different directions so that at least some of the segments are collected in different orientations.

4. The method of claim 2 wherein said receptacle is rotated as the strands are cut so that the segments are oriented in essentially a radially outwardly extending direction.

5. The method of claim 4 wherein said receptacle is moved back and forth in a linear direction underneath the cutter mechanism to control the height of the segment pile on regions of the receptacle.

6. The method of claim 2 wherein the receptacle has a shape generally corresponding to a desired shape of the charge.

7. The method of claim 1 wherein said strands comprise glass fibers.

8. The method of claim 7 wherein said strands are cut into segments of about 0.25 to 2 inches.

9. The method of claim 7 wherein said strands are cut into segments of about 0.75 to 1.25 inch.

10. The method of claim 7 wherein said resin is a heat curable polyester resin.

11. Apparatus for making a charge to be used in molding a fiber reinforced part, said apparatus comprising:
    a first rotating drum for pulling continuous strands of fibers through a resin bath to thereby impregnate the strands with wet curable resin;
    a cutter mechanism having a second rotating drum in a spaced relationship adjacent said first drum such that a gap is formed between said drums enabling passage of said cutter mechanism between said drums during rotation of said drums, said cutter mechanism including;
    a spring means extending radially outwardly from said second rotating drum, and a cutting head affixed to an outer portion of said spring means for cutting the wet flaccid impregnated strands on the first drum into segments of predetermined lengths before the wet resin cures, the second drum being spaced from the first drum by a distance to permit the spring member to bend when the head strikes the wet strands on the first drum; and
    receiving means for collecting the wet segments in a predetermined orientation so that the segments are piled together.

12. The apparatus of claim 11 wherein said receiving means comprises a receptacle located beneath the cutter mechanism for collecting the cut segments.

13. The apparatus of claim 12 which further comprises:
    motive means for moving the receptacle so that the cut segments fall by gravity on various regions of the receptacle.

14. The apparatus of claim 13 wherein said motive means is adapted to move the receptacle relative to the cutter mechanism in at least two different directions so that at least some of the segments lie in different orientations.

15. The apparatus of claim 13 wherein the motive means includes:
    means for rotating the receptacle so that the segments are essentially oriented in a radially outwardly extending direction.

16. The apparatus of claim 15 wherein said motive means further includes:
    means for moving the receptacle back and forth in a linear direction underneath the cutter mechanism to control the height of the segment pile on regions of the receptacle.

17. The apparatus of claim 11 wherein said second drum is disposed adjacent the first rotating drum and has its major axis generally parallel to the axis of the first drum, said second drum rotating in an opposite direction than the first drum;
  spring means in the form of a generally planar sheet of resilient material extending radially outwardly from the second drum; and
  a cutting head fixed to an edge of said resilient sheet and adapted to cut the strands passing over the first drum into segments of predetermined lengths.

18. The apparatus of claim 17 wherein said second drum includes a slot formed therein, with an opposite edge of the spring being held in the slot.

19. A cutter mechanism for cutting resin impregnated fiber strands pulled over a first rotating drum, said mechanism comprising:
  a second drum disposed in a spaced relationship adjacent the first rotating drum forming a gap between said drums and having its major axis generally parallel to the axis of the first drum, said second drum rotating in an opposite direction than the first drum;
  spring means in the form of a generally planar sheet of resilient material extending radially outwardly from the second drum; and
  a cutting head affixed to an edge of said resilient sheet and adapted to cut the strands passing over the first drum into segments of predetermined lengths, the second drum being spaced from the first drum by a distance to permit the spring member to bend when the head strikes the wet strands on the first drum.

20. The cutter mechanism of claim 19 wherein the second drum includes a slot formed therein, with an opposite edge of the spring being held in the slot.

21. A method of forming reinforced part from a charge comprising:
  pulling continuous strands of raw fibers through a resin bath by a rotating drum;
  saturating said strands with curable resin from said bath;
  cutting the wet flaccid resin saturated strands on the drum with a rotating cutter mechanism into segments of predetermined lengths before the resin cures, the cutter mechanism having a second counter rotating drum spaced from the first drum and carrying a radially extending spring member with a cutting head attached to the end thereof, the second drum being spaced from the first drum by a distance to permit the spring member to bend when the head strikes the wet strands on the first drum;
  collecting said segments in a rotating receptacle so that they are radially oriented and piled together to form a charge; and
  forming a fiber reinforced part from said charge.

* * * * *